US012540501B1

(12) United States Patent
Liu

(10) Patent No.: US 12,540,501 B1
(45) Date of Patent: Feb. 3, 2026

(54) QUICK-ASSEMBLY SEALED SAFETY CABINET

(71) Applicant: GINUP INTERNATIONAL TRADING INC, Newark, DE (US)

(72) Inventor: Junjing Liu, Newark, DE (US)

(73) Assignee: GINUP INTERNATIONAL TRADING INC., Newark, DE (US)

(*) Notice: Subject to any disclaimer, the term of this patent is extended or adjusted under 35 U.S.C. 154(b) by 0 days.

(21) Appl. No.: 18/800,383

(22) Filed: Aug. 12, 2024

(30) Foreign Application Priority Data

Aug. 2, 2024 (CN) ........................ 202411058559.X

(51) Int. Cl.
*E05G 1/02* (2006.01)

(52) U.S. Cl.
CPC ...................................... *E05G 1/02* (2013.01)

(58) Field of Classification Search
CPC .. E05G 1/02; E05G 1/024; E05G 1/10; E05G 1/00
See application file for complete search history.

(56) References Cited

U.S. PATENT DOCUMENTS

2002/0005151 A1* 1/2002 Alizade .................... E05G 1/024 109/49.5
2010/0027920 A1* 2/2010 Raidl ........................ B32B 1/00 428/36.1
2016/0273259 A1* 9/2016 DeBaldo ................ E05G 1/024

FOREIGN PATENT DOCUMENTS

DE 202024101590 U1 * 5/2024

OTHER PUBLICATIONS

Machine translation for DE 202024101590 (Year: 2024).*

* cited by examiner

*Primary Examiner* — Christine M Mills
*Assistant Examiner* — Christopher F Callahan
(74) *Attorney, Agent, or Firm* — Ming Jiang; OPENPTO US LLC

(57) ABSTRACT

The quick-assembly sealed safety cabinet is composed of a cabinet body front plate, a cabinet body rear plate, a cabinet body left side plate, a cabinet body right side plate, a cabinet body top plate and a cabinet body bottom plate. The cabinet body left side plate, the cabinet body right side plate, the cabinet body top plate and the cabinet body bottom plate are fixedly connected with the periphery of one side of the cabinet body front plate through bolts and nut structures, so that the cabinet body can be quickly and integrally sealed and assembled through the bolt assembly, the problem that the safety box is integrally large and difficult to transport is solved.

7 Claims, 12 Drawing Sheets

QUICK-ASSEMBLY SEALED SAFETY CABINET

TECHNICAL FIELD

The present disclosure relates to the technical field of safety cabinet, and in particular, to a quick-assembly sealed safety cabinet and an installation method thereof.

BACKGROUND

The safety cabinet is a special container and is mainly divided into a fireproof safety cabinet and an anti-theft safety cabinet according to the functions of the safety cabinet, and the anti-theft safety cabinet can be divided into two types of mechanical insurance and electronic insurance according to different password working principles, and the former is characterized in that the price is relatively cheap and the performance is relatively reliable; at present, the safety cabinets in the market are generally formed by welding the whole cabinet body, the structure is large, transportation and carrying are inconvenient, meanwhile, the fireproof effect of the household safety cabinet on the market is not good enough, the common household safety cabinet is mainly anti-theft, and the files stored in the household safety cabinets are easy to lose when a high-temperature burning cabinet body occurs at home, so that the use of people is influenced, inconvenience is brought to people, and the use requirements of the current people cannot be met.

According to Chinese Patent Publication Number: CN 108678593A, the disclosed household safety cabinet belongs to the technical field of safety cabinets. A sliding rod is slidably clamped to the top end and the low end of the front end surface of the fixing plate. A pulling plate is connected to the interior of the rear end surface of the placing plate in a sliding and clamping manner. A sliding column is connected to the surface of the rear end of the pulling plate in a sliding and clamping manner. A first spring, a first contraction column and a second spring are arranged in the fixing plate; when the safety cabinet is used, the outer pulling limiting block vertically slides the connecting rod to adjust the position of the placing plate, the surface of the releasing limiting block and the fixing rod is connected to the bottom surface of the placing plate, the pulling plate and the moving sliding column are pulled out, the limiting column is embedded into the second circular groove, the placing plate can be unfolded horizontally, and the height position is adjusted to fully utilize the inner space of the safety cabinet to avoid leaving a gap.

SUMMARY

In view of the deficiencies of the prior art, the present invention provides a quick-assembly sealed safety cabinet and an installation method thereof, which solve the safety problem that the size of a household safety cabinet is large and inconvenient to transport.

To achieve the above objective, the present disclosure is implemented by the following technical solutions, a quick-assembly sealed safety cabinet comprises a safe cabinet body, wherein the safety cabinet body is composed of a cabinet body front plate, a cabinet body rear plate, a cabinet body left side plate and a cabinet body right side plate, the cabinet body top plate and the cabinet body bottom plate are fixed through bolts and nut structures, a mounting groove is formed in the middle of the cabinet body front plate in a penetrating manner, a plurality of hinge seats is fixedly connected to one side of the mounting groove, a cabinet door plate is hinged to the cabinet body front plate through a hinge seat, a coded lock is fixedly connected to the upper side of the front face of the cabinet door plate, a pressure sensor and a wireless module are arranged in the coded lock, and a handle is fixedly connected to the lower side of the front face of the cabinet door plate.

Preferably, the cabinet body left side plate comprises a cabinet body left side plate body, a left side plate connecting plate, a left side plate connecting strip, a placing plate and a placing screw hole, a left side plate connecting plate is fixedly connected to the periphery of one side of the cabinet body left side plate body, and a left side plate connecting strip is fixedly connected to one side of the left side plate connecting plate.

Preferably, the cabinet body right side plate comprises a cabinet body right side plate body, a right side plate connecting plate, a right side plate connecting strip and a side plate connecting screw hole, a right side plate connecting plate is fixedly connected to the periphery of one side of the cabinet body right side plate body, a plurality of side plate connecting screw holes is fixedly connected to one side of the right side plate connecting plate, a plurality of placing plates is connected to the adjacent side array buckles of the cabinet body right side plate body and the cabinet body left side plate body in an array manner, and a plurality of placing screw holes is formed in the surface of the placing plate in a penetrating manner.

Preferably, a plurality of marking mechanisms is fixedly connected to both the left side plate body of the cabinet body and the lower end of one side of the right side plate body of the cabinet body, the marking mechanism comprises a marking box, a feeding port, a scented sheet, a discharging hole, a blocking plate, a telescopic column, a fixing rod, a sealing plate and a spring, the middle of the marking box is fixedly connected with a telescopic column and a spring, the spring is wound on the outer side of the telescopic column, the lower end of the telescopic column and the lower end of the spring are fixedly connected with a sealing plate, the sealing plate is slidably connected with the lower end of the marking box, fixing rods are fixedly connected to the two sides of the upper surface of the sealing plate, and a blocking plate is fixedly connected to the upper end of the fixing rod.

Preferably, the cabinet body top plate comprises a cabinet body top plate body, a top plate connecting plate, a top plate connecting strip and a top plate connecting screw hole, a top plate connecting plate is fixedly connected to the periphery of one side of the cabinet body top plate body, a top plate connecting strip is fixedly connected to the side face of the outer end of the top plate connecting plate, and the top plate connecting strip is of a U-shaped structure.

Preferably, the cabinet body bottom plate comprises a cabinet body bottom plate body, a bottom plate body connecting plate and a bottom plate body connecting strip, a bottom plate body connecting plate is fixedly connected to the periphery of one side of the cabinet body bottom plate body, a bottom plate body connecting strip is fixedly connected to the outer side of one end of the bottom plate body connecting plate, the bottom plate body connecting strip is of a U-shaped structure, and a plurality of top plate connecting screw holes is formed in the surface of the bottom plate body connecting plate, the bottom plate body connecting strip, the top plate connecting plate and the top plate connecting strip in an array, a rear plate body connecting plate is fixedly connected to the periphery of one side of the cabinet body rear plate body, a plurality of rear plate body connecting holes is formed in the outer side of the rear plate body connecting plate in a penetrating array, a limiting plate is fixedly connected to the lower end of one side of the cabinet body rear plate body, and a plurality of limiting grooves is formed in an array of one side of the limiting plate in a penetrating manner.

Preferably, the inner side of the cabinet door plate is fixedly connected with a recording mechanism, the recording mechanism comprises a recording box, a storage battery, an acceleration sensor, a data memory, a hidden camera and a sound collector, one side of the recording box is fixedly connected with the middle of the inner side of the cabinet door plate, the bottom in the recording box is fixedly connected with a storage battery, the middle in the recording box is fixedly connected with an acceleration sensor, the top in the recording box is fixedly connected with a data memory and a hidden camera, and the top of the recording box is fixedly connected with a sound collector.

Preferably, a plurality of fixing bolts is fixedly connected to the periphery of one side of the cabinet front plate; the side plate connecting screw holes and the top plate connecting screw holes correspondingly formed in the cabinet body left side plate body, the cabinet body right side plate body, the cabinet body top plate body and the cabinet body bottom plate body are slidably connected with adjacent fixing bolts in a sliding and sliding manner and are fixed to the periphery of one side of the cabinet body front plate through nuts; and the cabinet body left side plate body, the cabinet body right side plate body, the cabinet body top plate body and the cabinet body bottom plate body are slidably connected with the four sides and are connected with the corresponding side plate connecting screw holes and the side plate connecting screw holes through bolt and nut assemblies, and the top plate connecting screw holes are fixed through threaded connection.

Preferably, the upper end of the cabinet body left side plate body and the cabinet body right side plate body are slidably connected with two sides of the cabinet body top plate body, the cabinet body left side plate body, the cabinet body right side plate body and the cabinet body top plate body are slidably connected with the two sides of the cabinet body bottom plate body through bolt and nut assemblies, and the cabinet body left side plate body, the cabinet body right side plate body and the cabinet body bottom plate body are fixed through threaded connection through bolt and nut assemblies and corresponding side plate connecting screw holes and top plate connecting screw holes.

Preferably, a protective layer is arranged on the outer side of the safety cabinet body, a heat insulation layer is arranged on the inner side of the protective layer, a main body layer is arranged on the inner side of the heat insulation layer, an inner layer is arranged on the inner side of the main body layer, the protective layer is a polyurethane coating, and the heat insulation layer is a polyurethane foam layer.

An installation method of a quick-installation sealed safety cabinet includes the following steps:

S1: the cabinet body left side plate body, the cabinet body right side plate body, the cabinet body top plate body and the cabinet body bottom plate body are sequentially limited and placed on one side of one side of the cabinet body bottom plate body and the cabinet body bottom plate body, and then the corresponding fixing bolts are in threaded connection with the cabinet body left side plate body, the cabinet body right side plate body, the cabinet body top plate body and the cabinet body bottom plate body, and then are in threaded connection with the fixing bolts through nuts to fix the cabinet body left side plate body, the cabinet body right side plate body, the cabinet body top plate body and the cabinet body bottom plate body.

S2: the side plate connecting screw holes and the top plate connecting screw holes adjacent to one side of the cabinet body left side plate body and the cabinet body top plate body are aligned, then the cabinet body left side plate body and the cabinet body top plate body are fixed by bolts and nuts, then the side plate connecting screw holes and the top plate connecting screw holes adjacent to one side of the cabinet body right side plate body and the cabinet body top plate body are aligned, and then the cabinet body left side plate body and the cabinet body top plate body are fixed by bolts and nuts; then the side plate connecting screw holes and the top plate connecting screw holes adjacent to one side of the cabinet body left side plate body and the cabinet body bottom plate body are aligned, then the cabinet body right side plate body and the cabinet body bottom plate body are fixed through bolts and nuts, then the side plate connecting screw holes and the top plate connecting screw holes adjacent to one side of the cabinet body right side plate body and the cabinet body bottom plate body are aligned, and then the cabinet body right side plate body and the cabinet body bottom plate body are fixed through bolts and nuts.

S3: the cabinet body rear plate body is limited and placed on the other side of the cabinet body left side plate body, the cabinet body right side plate body, the cabinet body top plate body and the cabinet body bottom plate body, the rear plate body connecting holes are aligned with the corresponding side plate connecting screw holes and the top plate connecting screw holes, and the whole cabinet body assembly is completed by fixing bolts and nuts.

Beneficial Effects

The present invention provides a quick-assembly sealed safety cabinet and an installation method thereof. Compared with the prior art, the present invention has the following beneficial effects:

1. In the present invention, the cabinet body of the safety cabinet is divided into six plate bodies through the arranged cabinet body front plate, the cabinet body rear plate, the cabinet body left side plate, the cabinet body right side plate, the cabinet body top plate and the cabinet body bottom plate, and the cabinet body is combined into a complete scaling cabinet body through bolts, therefore, the problem that the whole cabinet body cannot be disassembled and carried conveniently is solved on the premise of ensuring period scaling, and meanwhile, through the arranged fixing bolts and the like, the cabinet body left side plate body, the cabinet body right side plate body, the cabinet body top plate body and the cabinet body bottom plate body can be quickly combined with the periphery of one side of the cabinet body front plate, so that the cabinet body can be quickly and integrally sealed and assembled through the bolt assembly, the problem that the safety cabinet is integrally large and difficult to transport is solved, meanwhile, assembling is convenient, rapid assembling of the safety cabinet can be achieved, and the use efficiency of the safety cabinet is improved.

2. The protective layer is a polyurethane coating, the polyurethane coating can provide good wear resistance and scratch resistance, meanwhile, various colors and textures can be selected, the appearance of the safety cabinet is effectively improved, the wear resistance of the safety cabinet body is also improved, the appearance of the safety cabinet is prevented from being affected by scratches during transportation and use, and the heat insulation layer is a polyurethane foam layer through the arranged heat insulation layer, the polyurethane foam is a light and efficient heat insulation material, the heat insulation effect of the safety cabinet is effectively improved, the heat insulation effect of the safety cabinet is effectively improved while good mechanical strength is provided, a good protection environment is provided for property when a fire occurs at home, and financial loss is avoided.

3. In the present invention, by setting the coded lock, when the safety cabinet is opened or a large-amplitude movement occurs, the pressure sensor generates a signal and then transmits the signal to the wireless module, and is remotely transmitted to the mobile terminal of the user by using the wireless network, so that the safety coefficient of the safe is effectively improved.

4. In the present disclosure, the height position of the placement plate can be adjusted according to the placed specific article by the placement plate connected with the buckle, so as to adjust the layering height inside the device, so as to adapt to storage of articles of different volumes.

5. In the present invention, when the safety cabinet is placed on the ground through the arranged marking mechanism, once the safety cabinet is placed on the ground, once the safety cabinet is lifted to slightly displace, the extruded spring is ejected out, at this time, the sealing plate drives the fixing rod and the blocking plate to move outwards, at the moment, the ink in the upper end of the marking box flows out through the discharging hole, in addition, the ink contains the fragrance of the dissolved incense sheet, traces are left on the ground after the ink is washed out, and meanwhile, the smell is left to remind the user that someone moves through the safety cabinet, so that the user is alerted, the property safety of the user is improved, and the safety effect of the device is improved.

6. In the present invention, through the arranged recording mechanism, when the front plate of the cabinet body is opened, the acceleration sensor senses that the front plate of the cabinet body moves and then sends out an electric signal, and then the sound collector and the hidden camera start to start, record the opened video and audio, and then automatically save the video and the audio after being opened, so as to reduce the center of quitting, and once a theft event occurs, the user can extract the report from the data memory, so that the user can find the case conveniently, find a thief, effectively improve the safety of the safe, and improve the property safety of the user.

7. In the present invention, through the arrangement of the limiting plate, when in use, the user places the gun barrel part of the gun needing to be stored in each limiting groove, and the gun can be quickly fixed through the limiting groove, so that the effect of fixing the gun for storage is provided for the device.

DESCRIPTION OF FIGURES

1—a cabinet body front plate; 2—a cabinet body rear plate; 201—a cabinet body rear plate body; 202—a rear plate body connecting plate; 203—a rear plate body connecting hole; 204—a limiting plate; 205—a limiting slot; 3—a cabinet body left side plate; 301—a cabinet body left side plate body; 302—a left side plate connecting plate; 303—a left side plate connecting strip; 304—a placing plate; 305—a placing screw hole; 4—a cabinet body right side plate; 401—a cabinet body right side plate body; 402—a right side plate connecting plate; 403—a right side plate connecting strip; 404—a plurality of side plate connecting screw holes; 5—a cabinet body top plate; 501—a cabinet body top plate body; 502—a top plate connecting plate; 503—a top plate connecting strip; 504—a top plate connecting screw hole; 6—a cabinet body bottom plate; 601—a cabinet body bottom plate body; 602—a bottom plate body connecting plate; 603—a bottom plate body connecting strip; 7—a mounting groove; 8—hinge seats; 9—a cabinet door plate; 10—a coded lock; 11—a handle; 12—fixing bolts; 13—a protective layer; 14—a heat insulating layer; 15—a main body layer; 16—an inner layer; 17—a marking mechanism; 1701—a marking box; 1702—a feeding port; 1703—a scented sheet; 1704—a discharging hole; 1705—a blocking plate; 1706—a telescopic column; 1707—a fixing rod; 1708—a sealing plate; 1709—a spring; 18—a recording mechanism; 1801—a recording box; 1802—a storage battery; 1803—an acceleration sensor; 1804—a data memory; 1805—a hidden camera; 1806—a sound collector.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are merely some but not all of the embodiments of the present invention. Based on the embodiments of the present invention. All other embodiments obtained by a person of ordinary skill in the art based on the embodiments of the present invention without creative efforts shall fall within the protection scope of the present invention.

Figure 1:
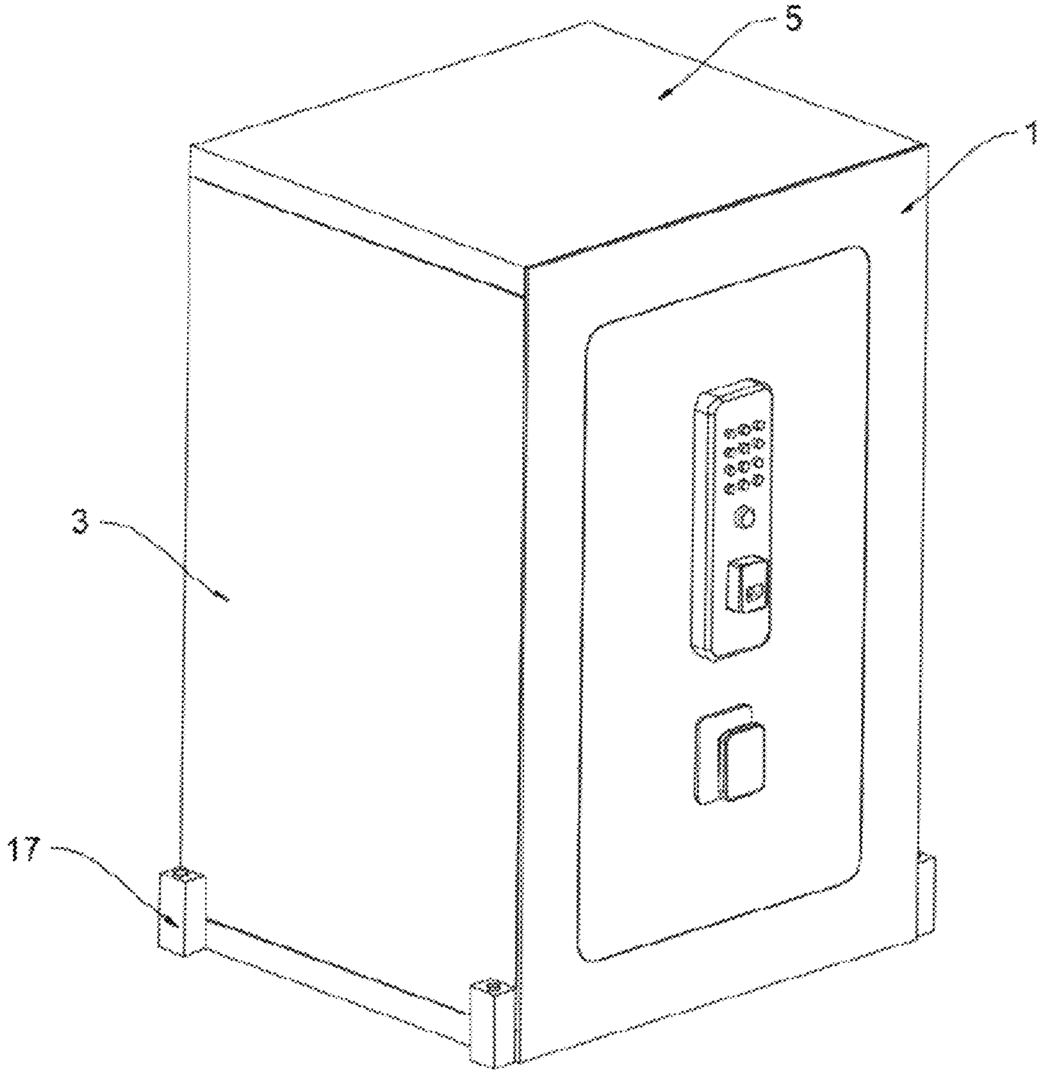
FIG. 1 is a schematic structural diagram of a front side of a quick-assembly sealed safety cabinet according to an embodiment of the present disclosure.
Figure 2:
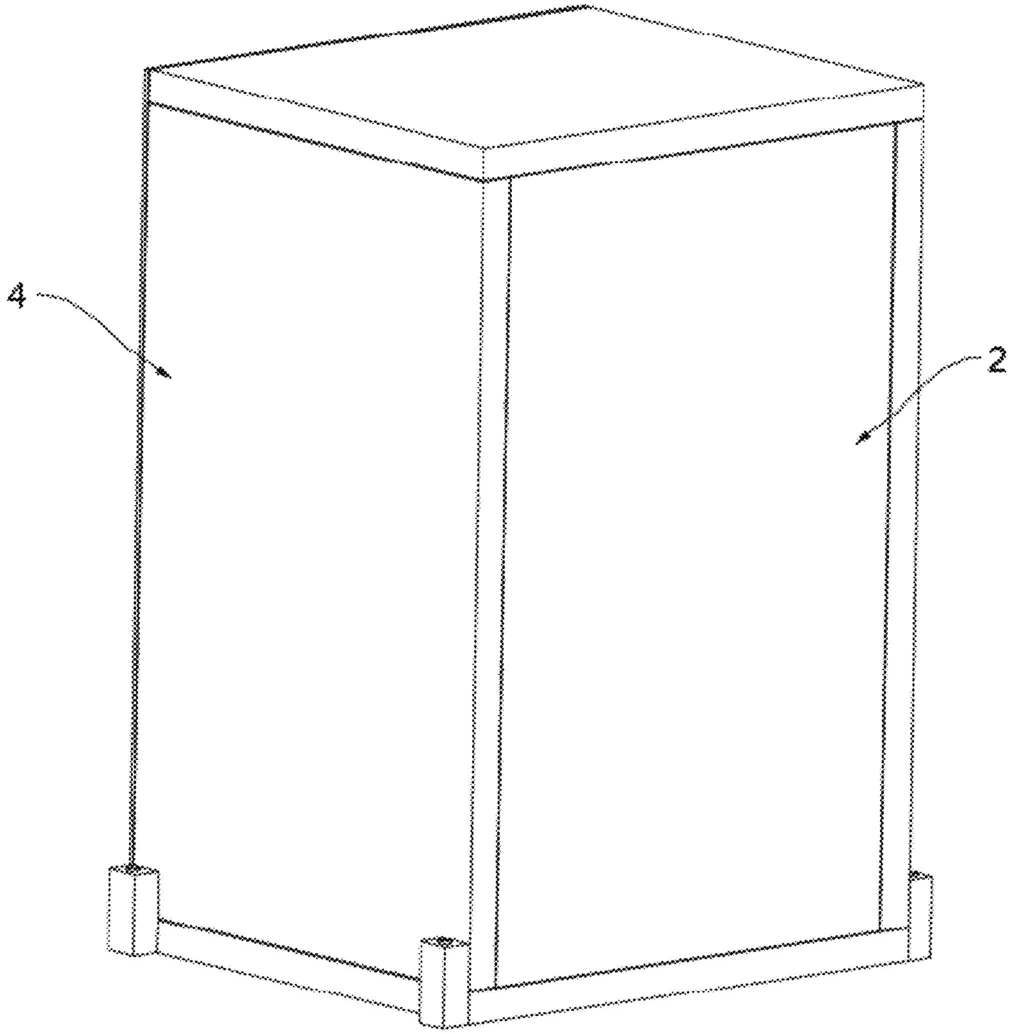
FIG. 2 is a schematic structural diagram of a rear side of a quick-assembly sealed safety cabinet according to an embodiment of the present disclosure.
Figure 3:
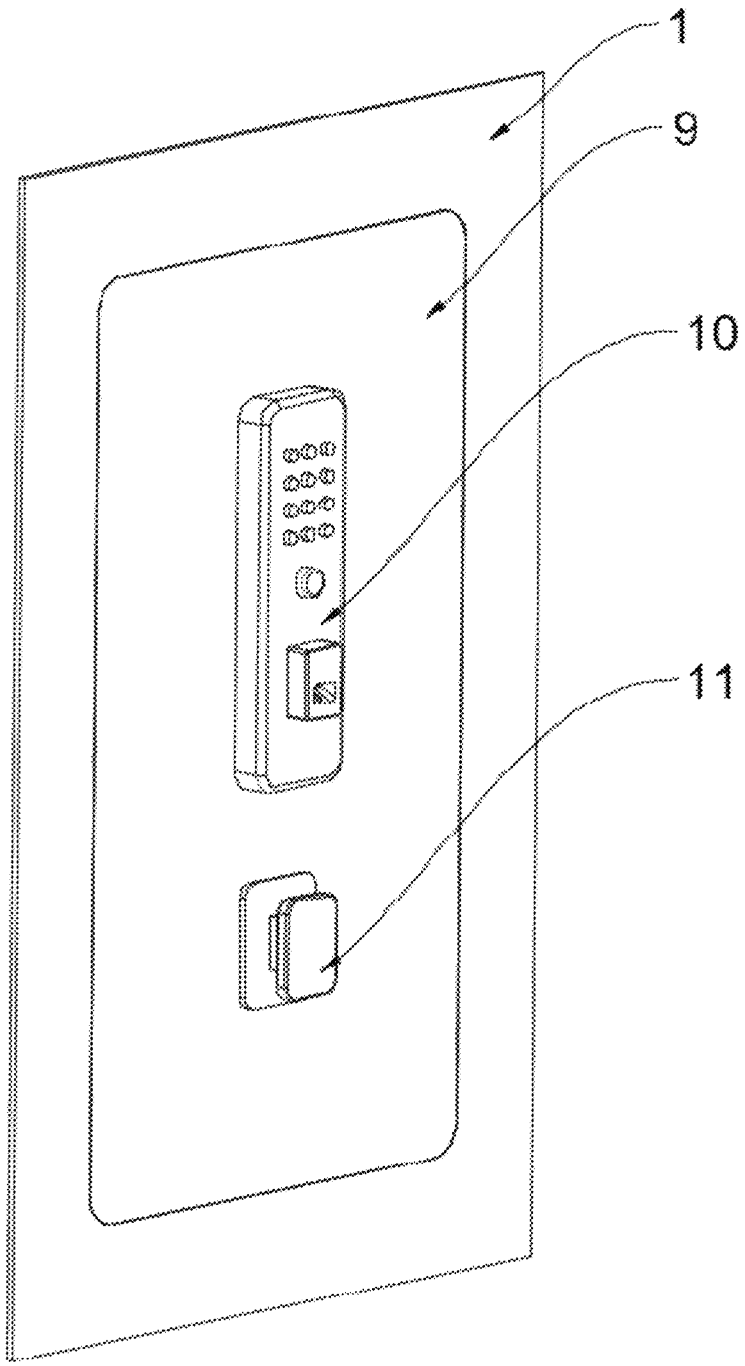
FIG. 3 is a schematic structural diagram of a front plate of a cabinet body of a quick-assembly sealed safety cabinet according to the present disclosure.
Figure 4:
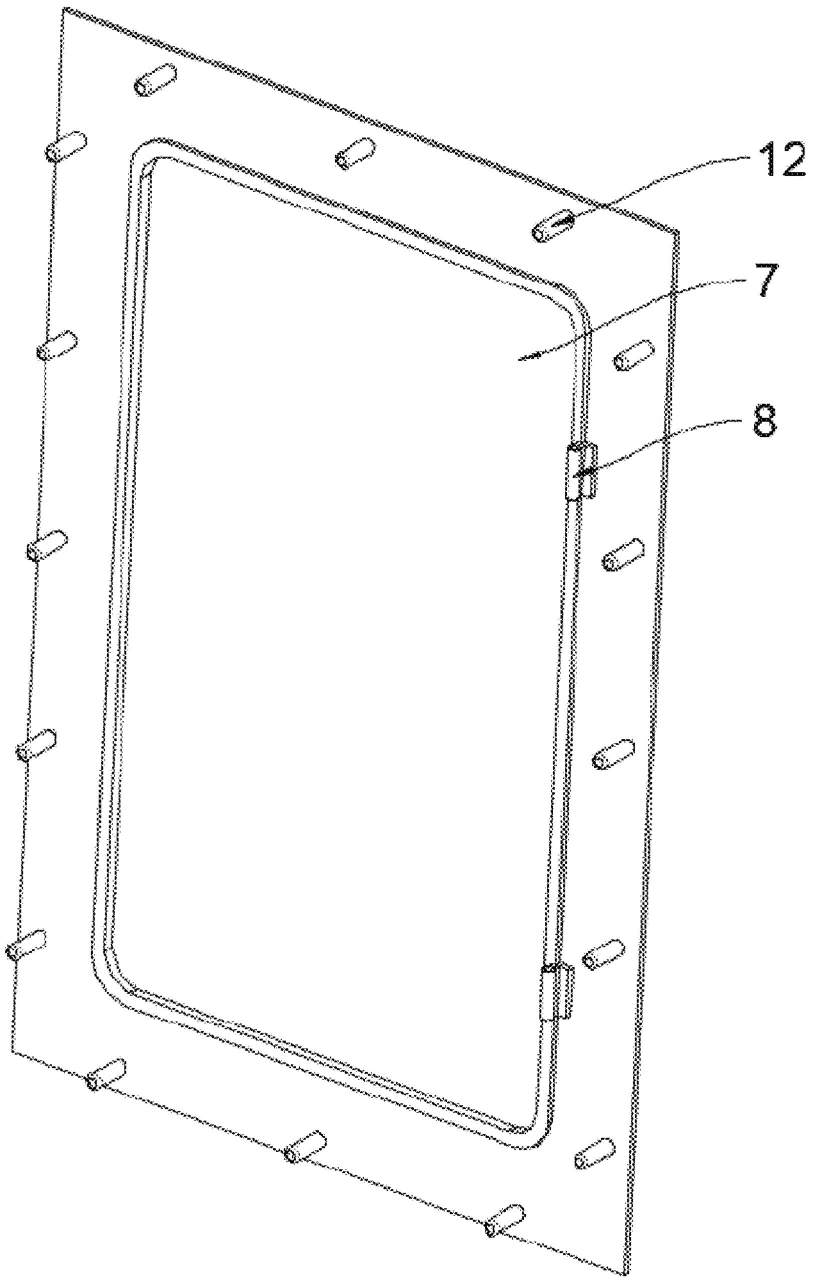
FIG. 4 is a schematic structural diagram of a rear side of a front plate of a cabinet body of a quick-assembly sealed safety cabinet according to the present disclosure.
Figure 5:
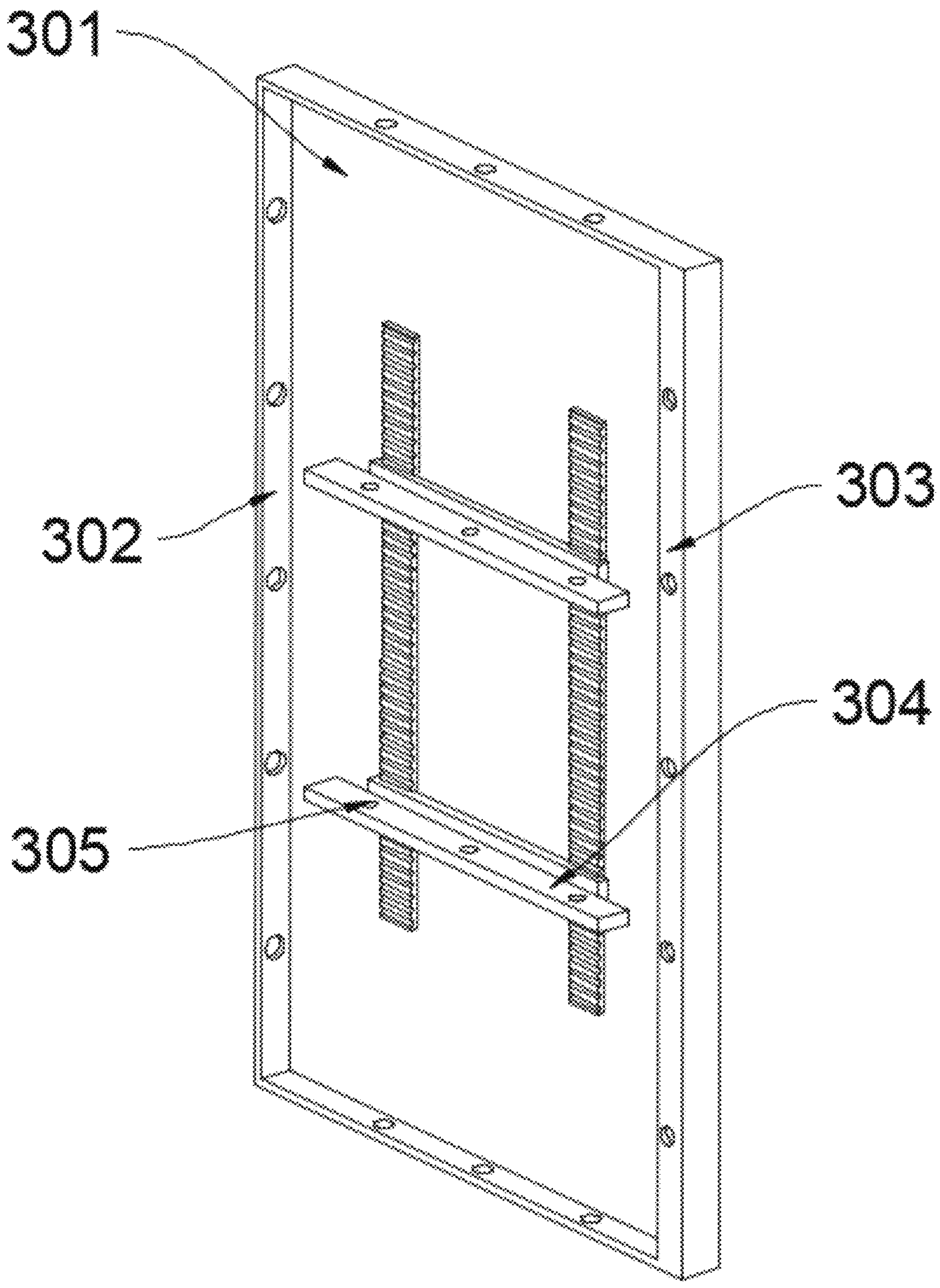
FIG. 5 is a schematic structural diagram of a left side plate of a cabinet body of a quick-assembly sealed safety cabinet according to the present disclosure.
Figure 6:
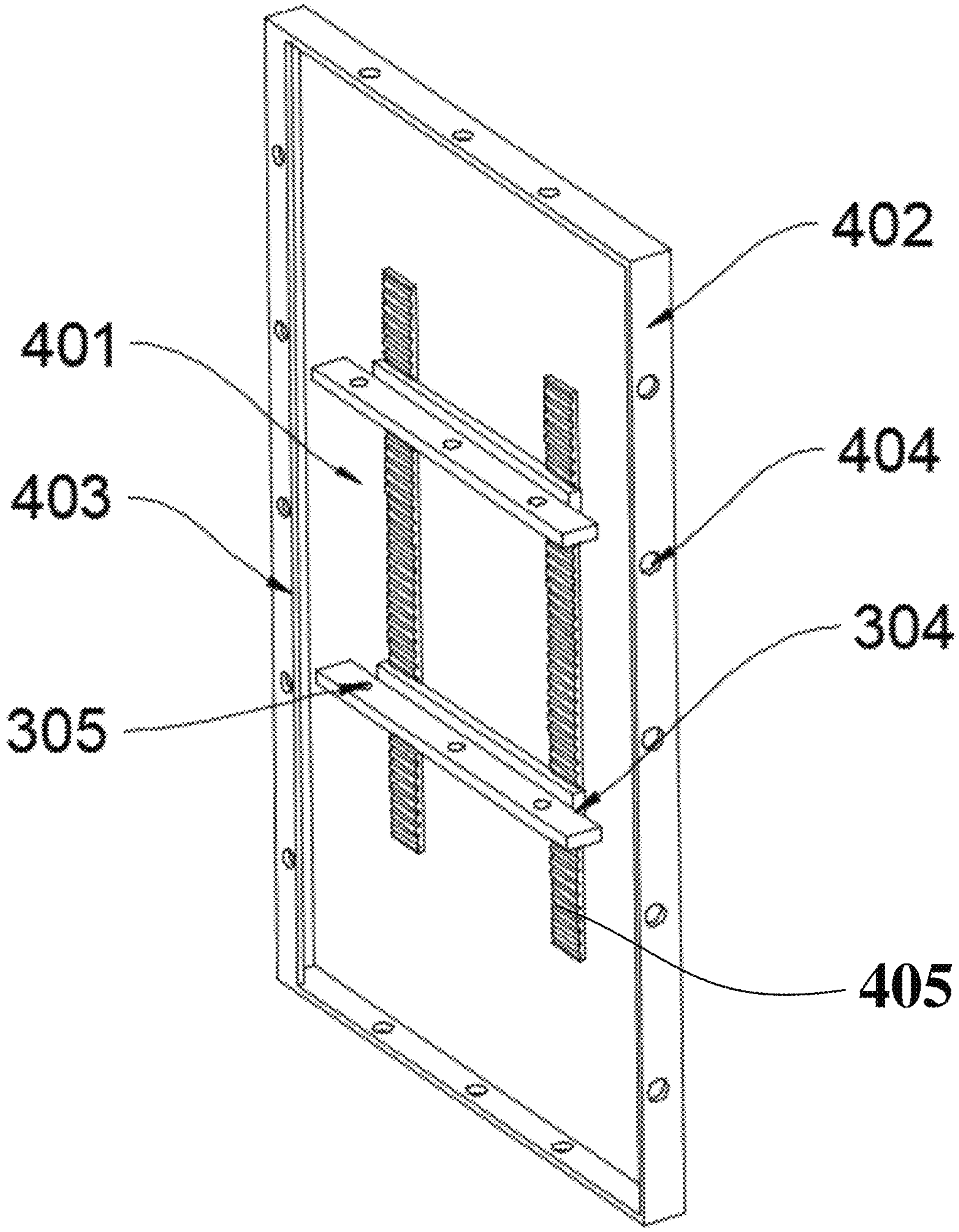
FIG. 6 is a schematic structural diagram of a right side plate of a cabinet body of a quick-assembly sealed safety cabinet according to the present disclosure.
Figure 7:
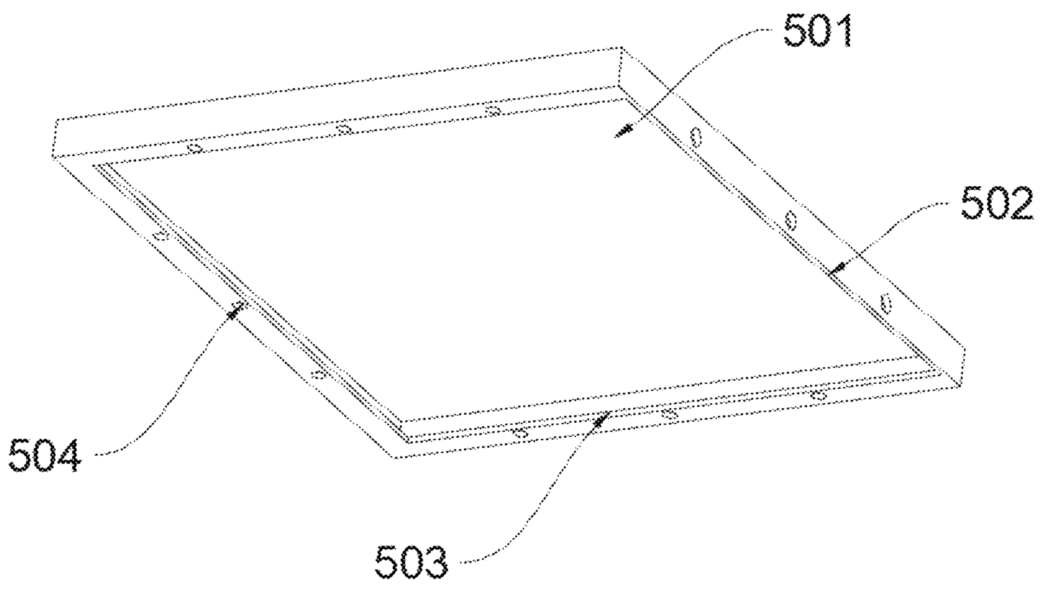
FIG. 7 is a schematic structural diagram of a top plate of a cabinet body of a quick-assembly sealed safety cabinet according to the present disclosure.
Figure 8:
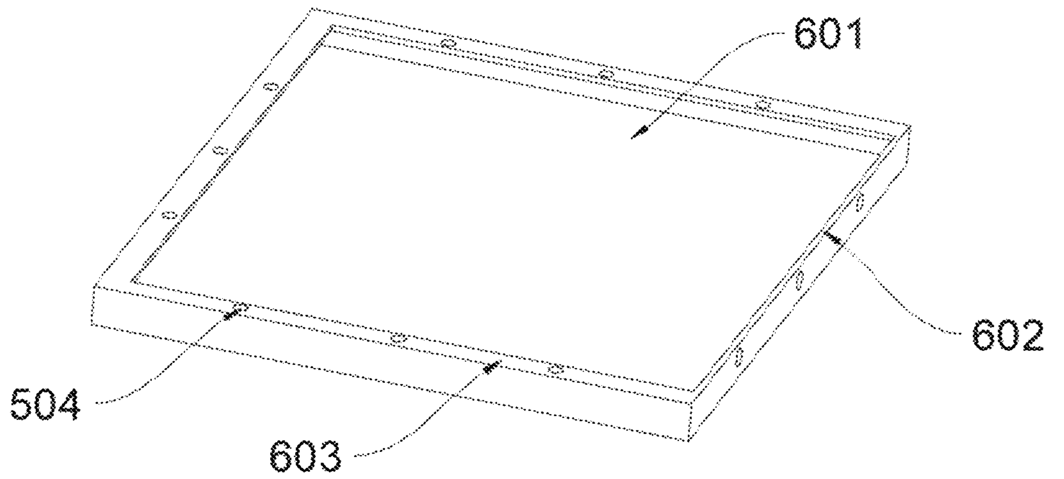
FIG. 8 is a schematic structural diagram of a cabinet bottom plate of a quick-assembly sealed safety cabinet according to the present disclosure.
Figure 9:
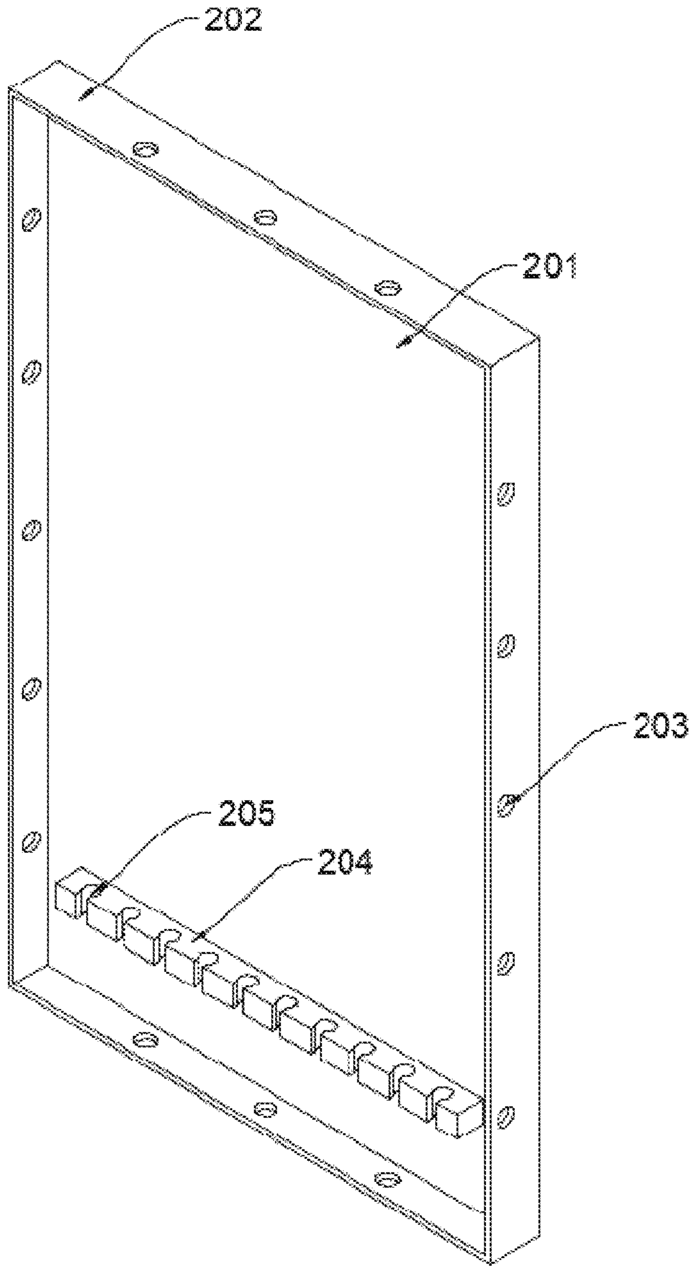
FIG. 9 is a schematic structural diagram of a rear plate of a cabinet body of a quick-assembly sealed safety cabinet according to the present disclosure.
Figure 10:
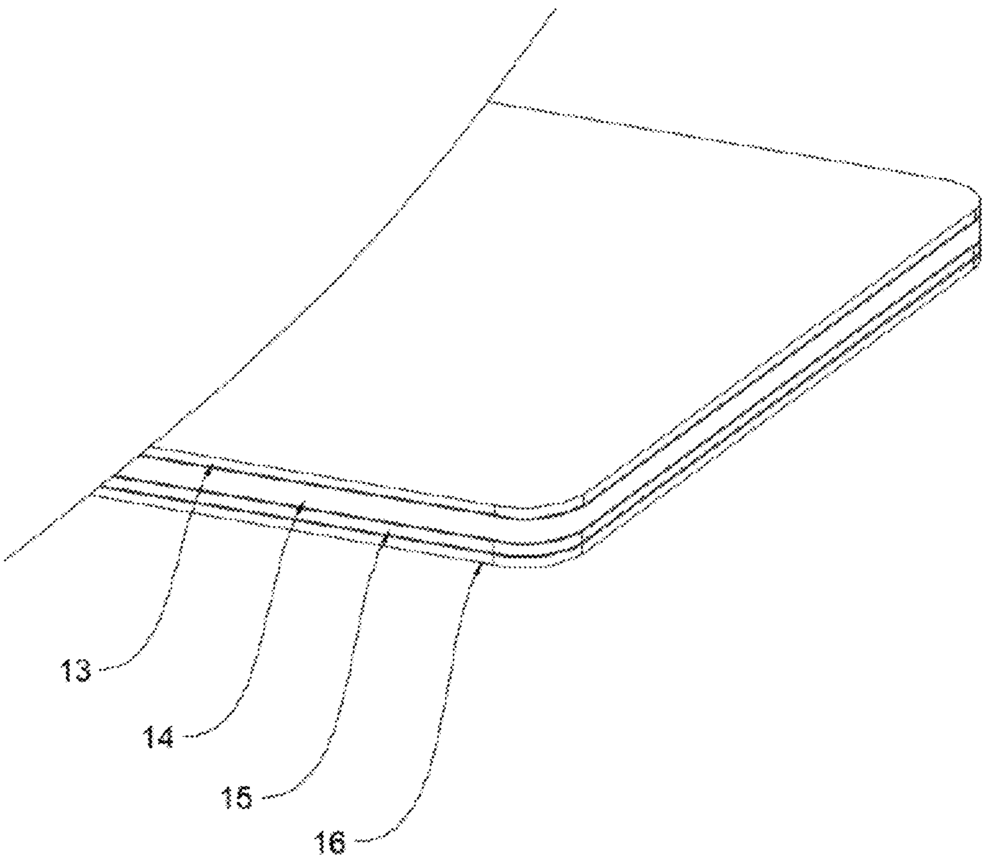
FIG. 10 is a schematic structural diagram of a cabinet body of a quick-assembly sealed safety cabinet according to the present disclosure.
Figure 11:
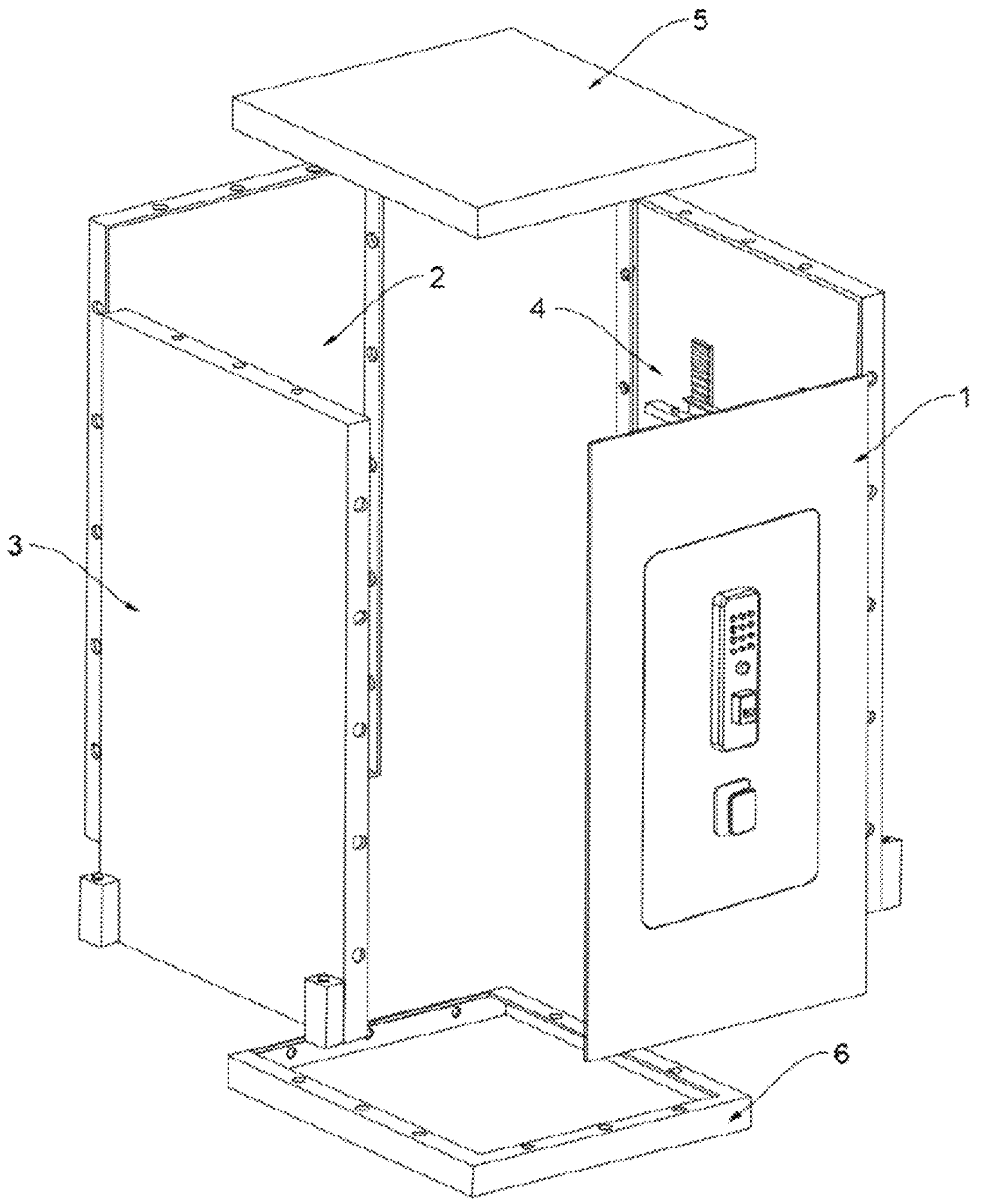
FIG. 11 is an exploded view of a cabinet body structure of a quick-assembly sealed safety cabinet according to the present disclosure.
Figure 12:
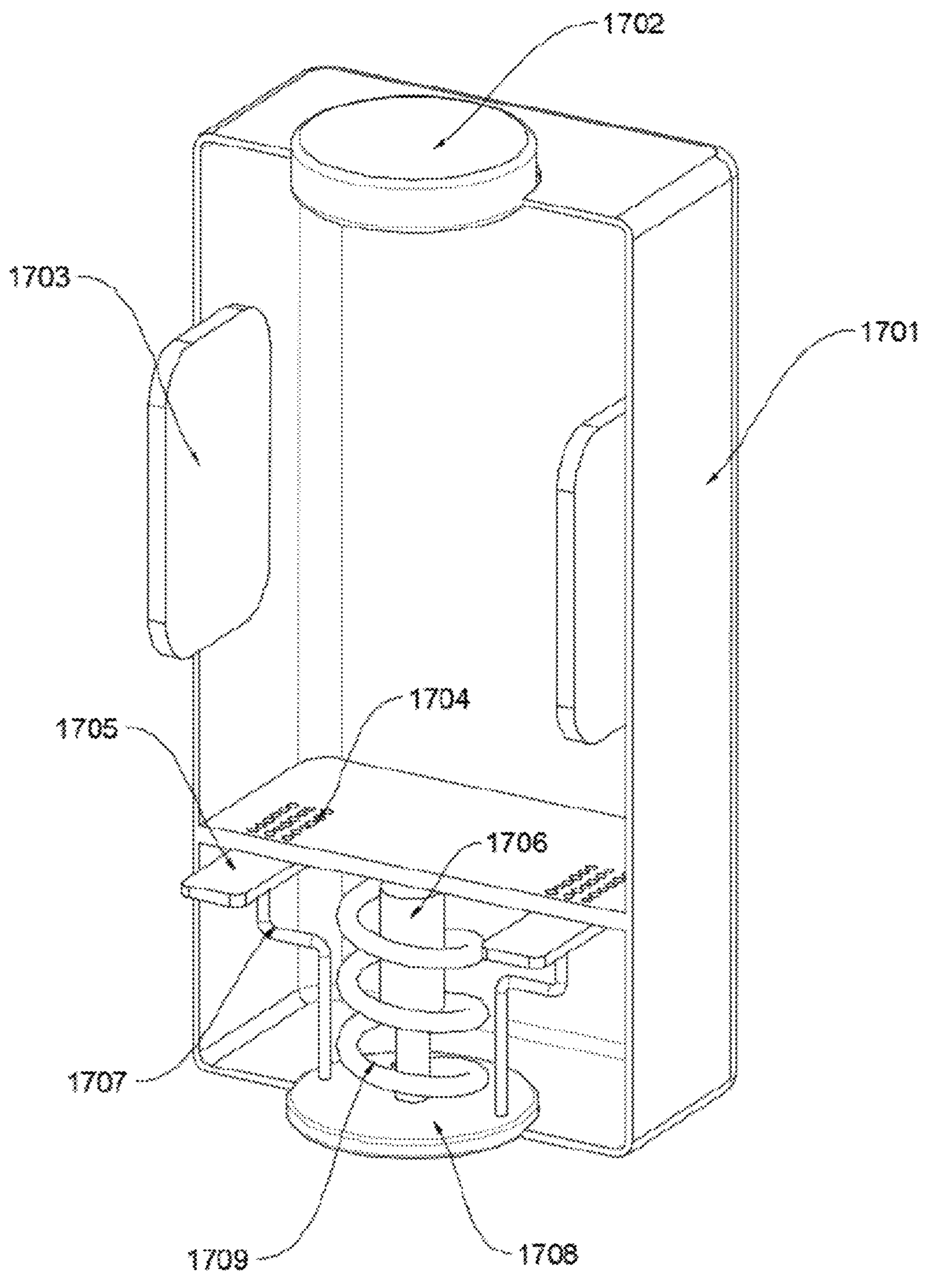
FIG. 12 is a schematic structural diagram of a marking mechanism of a quick-assembly sealed safety cabinet according to the present disclosure.
Figure 13:
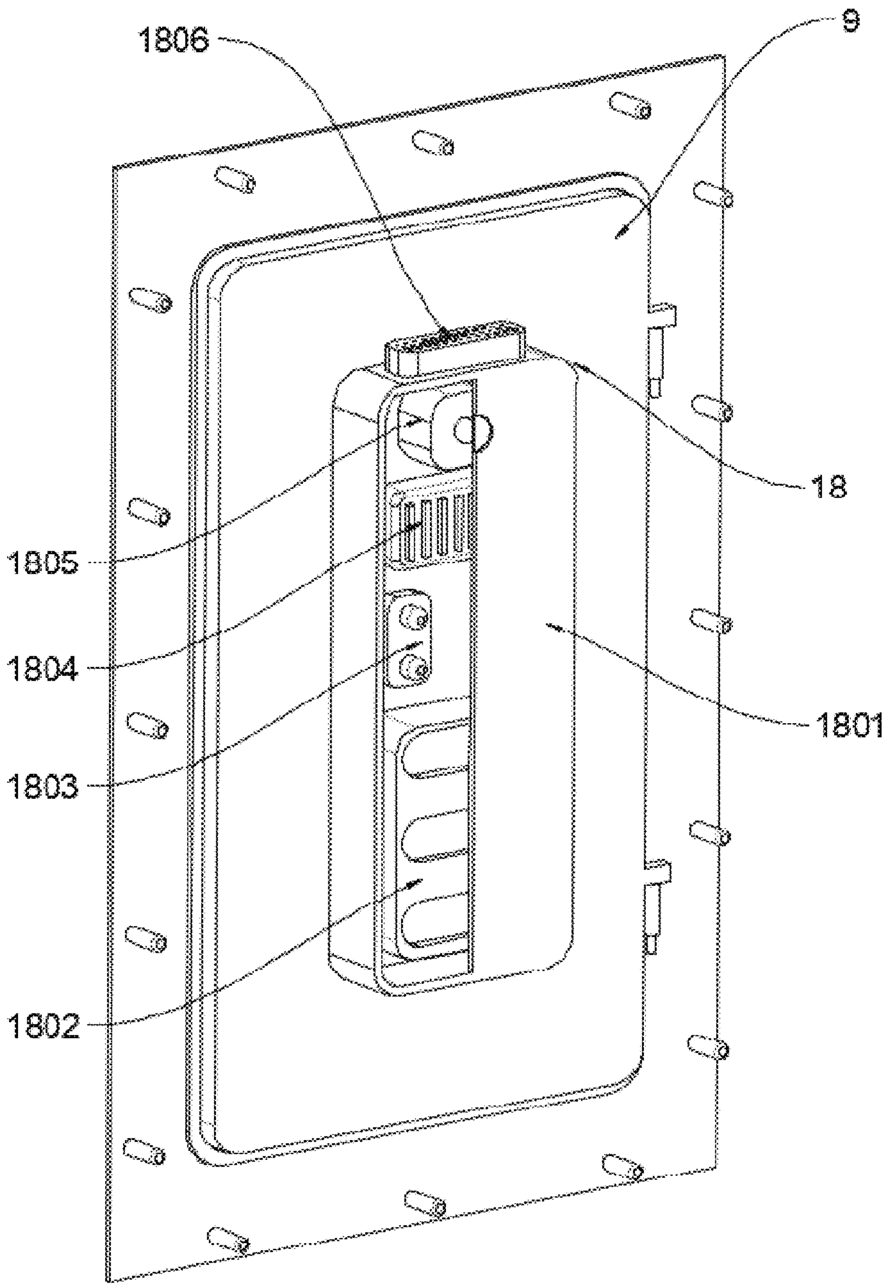
FIG. 13 is a schematic structural diagram of a recording mechanism of a quick-assembly sealed safety cabinet according to the present disclosure.

Referring to FIG. 1 to FIG. 13, the present disclosure provides two technical solutions, specifically including the following embodiments:

Embodiment 1

The cabinet body is composed of a cabinet body front plate 1, a cabinet body rear plate 2, a cabinet body left side plate 3, a cabinet body right side plate 4, a cabinet body top plate 5 and a cabinet body bottom plate 6. The cabinet body left side plate 3 comprises a cabinet body left side plate body 301, a left side plate connecting plate 302, a left side plate connecting strip 303, a placing plate 304 and a placing screw hole 305, a left side plate connecting strip 303 is fixedly connected to one side of the left side plate connecting plate 302, the cabinet body right side plate 4 comprises a cabinet body right side plate body 401, a right side plate connecting plate 402, a right side plate connecting strip 403 and side plate connecting screw holes 404, a right side plate connecting plate 402 is fixedly connected to the periphery of one side of the cabinet body right side plate body 401, and a right side plate connecting strip 403, a right side plate connecting plate 402 and a right side plate connecting strip 403 are fixedly connected to one side of the right side plate connecting plate 402, a plurality of side plate connecting screw holes 404 is formed in the surface of the left side plate connecting plate 302 and the left side plate connecting strip 303 in an array penetrating manner, a plurality of placing plates 304 is connected to the adjacent side array buckles of the cabinet body right side plate body 401 and the cabinet body left side plate body 301 in a buckled mode, a plurality of placing screw holes 305 are formed in the surface of the placing plate 304 in a penetrating mode, the cabinet body top plate 5 comprises a cabinet body top plate body 501, a top plate connecting plate 502, a top plate connecting strip 503 and a top plate connecting screw hole 504, and top plate connecting plates 502 are fixedly connected to the periphery of one side of the cabinet body top plate body 501, the top plate connecting strip 503 is of a U-shaped structure, the cabinet bottom plate 6 comprises a cabinet body bottom plate body 601, a bottom plate body connecting plate 602 and a bottom plate body connecting strip 603, a bottom plate body connecting plate 602 is fixedly connected to the periphery of one side of the cabinet body bottom plate body 601, a bottom plate body connecting strip 603 is fixedly connected to the outer side of one end of the bottom plate body connecting plate 602, and the bottom plate body connecting strip 603 is of a U-shaped structure, a bottom plate body connecting plate 602 and a bottom plate body connecting strip 603, a plurality of top plate connecting screw holes 504 is formed in the surface of the top plate connecting plate 502 and the top plate connecting strip 503 in an array, the cabinet body rear plate 2 comprises a cabinet body rear plate body 201, a rear plate body connecting plate 202 and a rear plate body connecting hole 203, a rear plate body connecting plate 202 is fixedly connected to the periphery of one side of the cabinet body rear plate body 201, a plurality of rear plate body connecting holes 203 is formed in the outer side of the rear plate body connecting plate 202 in a penetrating array, and a limiting plate 204 is fixedly connected to the lower end of one side of the cabinet body rear plate body 201, a plurality of fixing bolts 12 is fixedly connected to the periphery of one side of the cabinet body front plate 1, and side plate connecting screw holes 404 and top plate connecting screw holes 504 correspondingly formed in the cabinet body left side plate body 301, the cabinet body right side plate body 401, the cabinet body top plate body 501 and the cabinet body bottom plate body 601 are slidably connected with adjacent fixing bolts 12 in a sliding and sliding manner and are fixed to the periphery of one side of the cabinet body front plate 1 through nuts, the cabinet body left side plate body 301, the cabinet body right side plate body 401, the cabinet body top plate body 501 and the cabinet body bottom plate body 601 are slidably connected with the four sides of the cabinet body rear plate body 201 and are connected and fixed with the corresponding rear plate body connecting holes 203 and the side plate connecting screw holes 404 and the top plate connecting screw holes 504 in a threaded connection mode through bolt and nut assemblies, and the upper ends of the cabinet body left side plate body 301 and the cabinet body right side plate body 401 are slidably connected with the two sides of the cabinet body top plate body 501, the cabinet body left side plate body 301 and the cabinet body right side plate body 401 are slidably connected with two sides of the cabinet body bottom plate body 601, and the cabinet body left side plate body 301, the cabinet body right side plate body 401 and the cabinet body bottom plate body 601 are fixed through threaded connection with the corresponding side plate connecting screw holes 404 and the top plate connecting screw holes 504 through bolt and nut assemblies.

In operation, during assembly, the cabinet body front plate 1 is first laid flat, and then the cabinet body left side plate body 301, the cabinet body right side plate body 401, the cabinet body top plate body 501 and the cabinet body bottom plate body 601 are sequentially limited and placed on one side of the cabinet body bottom plate body 601 and the cabinet body front plate 1, and at this time, the corresponding fixing bolts 12 and the cabinet body left side plate body 301, the cabinet body right side plate body 401, the cabinet body top plate body 501 and the side plate connecting screw holes 404 on the cabinet body bottom plate body 601 are limited and penetrated by the top plate connecting screw holes 504, then the cabinet body left side plate body 301, the cabinet body right side plate body 401, the cabinet body top plate body 501 and the cabinet body bottom plate body 601 are fixed, then the side plate connecting screw holes 404 and the top plate connecting screw holes 504 adjacent to one side of the cabinet body left side plate body 301 and the cabinet body top plate body 501 are aligned, then the cabinet body left side plate body 301 and the cabinet body top plate body 501 are fixed by bolts and nuts, then the side plate connecting screw holes 404 and the top plate connecting screw holes 504 adjacent to one side of the cabinet body right side plate body 401 and the cabinet body top plate body 501 are aligned, and then the cabinet body right side plate body 401 and the cabinet body top plate body 501 are fixed by bolts and nuts; then fixing the side plate connecting screw holes 404 and the top plate connecting screw holes 504 on one side of the cabinet body left side plate body 301 and the cabinet body bottom plate body 601, then fixing the cabinet body right side plate body 401 and the cabinet body bottom plate body 601 on the other side adjacent to the cabinet body left side plate body 301, the cabinet body right side plate body 401, the cabinet body top plate body 501 and the cabinet body bottom plate body 601, aligning the rear plate body connecting holes 203 with the corresponding side plate connecting screw holes 404 and the top plate connecting screw holes 504, and fixing the whole cabinet body through bolts and nuts.

Embodiment 2

On the basis of the first embodiment, a mounting groove 7 is formed in the middle of the cabinet front plate 1 in a penetrating manner, a plurality of hinge seats 8 is fixedly connected to one side of the mounting groove 7, a cabinet door plate 9 is hinged to the cabinet body front plate 1 through a hinge seat 8, a coded lock 10 is fixedly connected to the upper side of the front face of the cabinet door plate 9, a handle 11 is fixedly connected to the lower side of the front face of the cabinet door plate 9, a protective layer 13 is arranged on the outer side of the safe cabinet body, a heat insulation layer 14 is arranged on the inner side of the protective layer 13, a main body layer 15 is arranged on the inner side of the heat insulation layer 14, and an inner layer 16 is arranged on the inner side of the main body layer 15, the heat insulation layer 14 is a polyurethane foam layer, a pressure sensor and a wireless module are provided inside the password lock 10, a plurality of marking mechanisms 17 is fixedly connected to a lower end of one side of the cabinet body left side plate body 301 and the cabinet body right side plate body 401, and the marking mechanism 17 comprises a marking box 1701, a feeding port 1702, a scented sheet 1703, a discharging hole 1704, a blocking plate 1705, a telescopic column 1706, a fixing rod 1707, a sealing plate 1708 and a spring 1709, the middle of the marking box 1701 is fixedly connected with a telescopic column 1706 and a spring 1709, the spring 1709 is wound on the outer side of the telescopic column 1706, the lower end of the telescopic column 1706 and the lower end of the spring 1709 are fixedly connected with a scaling plate 1708, the sealing plate 1708 is slidably connected with the lower end of the marking box 1701, two sides of the upper surface of the sealing plate 1708 are fixedly connected with a fixing rod 1707, and the upper end of the fixing rod 1707 is fixedly connected with a blocking plate 1705, a storage battery 1802, an acceleration sensor 1803, a data memory 1804, a hidden camera 1805, and a sound collector 1806 One side of the recording box 1801 is fixedly connected to the middle of the inner side of the cabinet door plate 9, a storage battery 1802 is fixedly connected to the bottom in the recording box 1801, an acceleration sensor 1803 is fixedly connected to the middle in the recording box 1801, a data memory 1804 and a hidden camera 1805 are fixedly connected to the top in the recording box 1801, and a sound collector 1806 is fixedly connected to the top of the recording box 1801.

When in use, when the safety cabinet is opened or moved, the pressure sensor generates a signal and then transmits the signal to the wireless module, and is remotely transmitted to the mobile terminal of the user by using the wireless network, so that the safety coefficient of the safety cabinet is effectively improved; when the safety cabinet is placed on the ground, the spring 1709 is squeezed out, and once the safety cabinet is lifted to slightly displace, the compressed spring 1709 pushes out the sealing plate 1708, and at this time, the sealing plate 1708 drives the fixing rod 1707 and the blocking plate 1705 to move outwards together, the ink in the upper end of the marking box 1701 flows out through the discharging hole 1704, then flows to the outside through the hole penetrating through the sealing plate 1708, traces are left on the ground after the ink is washed out, and meanwhile, the smell is left to remind the user that someone moves through the safety box, so that the user is alerted, the property safety of the user is improved, the safety effect of the device is improved, the protective layer 13 is a polyurethane coating, the polyurethane coating can provide good wear resistance and scratch resistance, and meanwhile, various colors and textures can be selected, the heat insulation layer 14 is a polyurethane foam layer, the polyurethane foam is a light and efficient heat insulation material, the polyurethane foam is a light and efficient heat insulation material, has good heat insulation performance and mechanical strength, effectively improves the heat insulation effect of the safety cabinet while providing good mechanical strength, provides a good protection environment for property when a high-temperature burning box body occurs at home, avoids financial loss, and when the cabinet body front plate 1 is opened, then the sound collector 1806 and the hidden camera 1805 start to start, record the opened video and audio, and then automatically store the opened video and audio in the data memory 1804. Therefore, the recording box 1801 is closed and cannot be easily perceived by a thief, so that a user can record a case from the data memory 1804, so that a user can find a case conveniently, find a thief, effectively improve the safety of the safe, and improve the property safety of the user.

An installation method of a quick-installation sealed safe case includes the following steps:

S1: the cabinet body left side plate body 301, the cabinet body right side plate body 401, the cabinet body top plate body 501 and the cabinet body bottom plate body 601 are sequentially arranged in a limiting manner, and then the corresponding fixing bolts 12 are in threaded connection with the cabinet body left side plate body 301, the cabinet body right side plate body 401, the cabinet body top plate body 501 and the cabinet body bottom plate body 601, and then the cabinet body left side plate body 301, the cabinet body right side plate body 401, the cabinet body top plate body 501 and the cabinet body bottom plate body 601 are fixed through threads;

S2: the side plate connecting screw holes 404 and the top plate connecting screw holes 504 adjacent to one side of the cabinet body left side plate body 301 and the cabinet body top plate body 501 are aligned, then fixed by bolts and nuts, then the side plate connecting screw holes 404 and the top plate connecting screw holes 504 adjacent to one side of the cabinet body right side plate body 401 and the cabinet body top plate body 501 are aligned, and then the cabinet body right side plate body 401 and the cabinet body top plate body 501 are fixed by bolts and nuts; then the side plate connecting screw holes 404 and the top plate connecting screw holes 504 adjacent to one side of the cabinet body left side plate body 301 and the cabinet body bottom plate body 601 are aligned, then fixed by bolts and nuts, then the side plate connecting screw holes 404 and the top plate connecting screw holes 504 adjacent to one side of the cabinet body right side plate body 401 and the cabinet body bottom plate body 601 are aligned, and then the cabinet body right side plate body 401 and the cabinet body bottom plate body 601 are fixed by bolts and nuts;

S3: the cabinet body rear plate body 201 is limited and placed on the other side of the cabinet body left side plate body 301, the cabinet body right side plate body 401, the cabinet body top plate body 501 and the cabinet body bottom plate body 601, the rear plate body connecting holes 203 are aligned with the corresponding side plate connecting screw holes 404 and the top plate connecting screw holes 504, and the whole cabinet body assembly is completed by fixing bolts and nuts.

The above are only preferred embodiments of the present application and are not intended to limit the present application, and any modifications, equivalent replacements and improvements made within the spirit and principle of the present application shall fall within the protection scope of the present application.

What is claimed is:

1. A quick-assembly sealed safety cabinet, comprising: a cabinet body front plate (1), a cabinet body rear plate (2), a cabinet body left side plate (3), a cabinet body right side plate (4), a cabinet body top plate (5) and a cabinet body bottom plate (6) which are fixed by bolts and nut structures, characterized in that: a mounting groove (7) is formed in the middle of the cabinet body front plate (1) in a penetrating mode, a plurality of hinge seats (8) is fixedly connected to one side of the mounting groove (7), a cabinet door plate (9) is hinged to the cabinet body front plate (1) through the hinge seat (8), a handle (11) is fixedly connected to the upper side of the front face of the cabinet door plate (9), a protection layer (13) is arranged on the outer side of the safety cabinet body, an inner side of the protective layer (13) is provided with a heat insulating layer (14), an inner side of the heat insulating layer (14) is provided with a main body layer (15), an inner side of the main body layer (15) is provided with an inner layer (16), the protective layer (13) is a polyurethane coating, and the heat insulating layer (14) is a polyurethane foam layer;

wherein the cabinet body left side plate (3) comprises a cabinet body left side plate body (301), a left side plate connecting plate (302), a left side plate connecting strip (303), a plurality of side plate connecting screw holes (404), a plurality of adjacent side array buckles (405), a plurality of placing plates (304), and a plurality of placing screw holes (305), the left side plate connecting plate (302) is fixedly connected to the periphery of one side of the cabinet body left side plate body (301), and the left side plate connecting strip (303) is fixedly connected to one side of the left side plate connecting plate (302);

wherein the cabinet body right side plate (4) comprises a cabinet body right side plate body (401), a right side plate connecting plate (402), a right side plate connecting strip (403) and a plurality of side plate connecting screw holes (404), a plurality of placing plates (304), and a plurality of placing screw holes (305), a plurality of adjacent side array buckles (405) is provided on the cabinet body right side plate body (401), the right side plate connecting plate (402) is fixedly connected to the periphery of one side of the cabinet body right side plate body (401), the right side plate connecting strip (403) is fixedly connected to one side of the right side plate connecting plate (402), the plurality of side plate connecting screw holes (404) is formed in the surface of the right side plate connecting plate (402), the right side plate connecting strip (403), the left side plate connecting plate (302) and the left side plate connecting strip (303) in an array penetrating manner, the plurality of placing plate (304) is connected to adjacent side array buckles (405) and the cabinet body left side plate body (301), and the plurality of placing screw holes (305) is formed in the surface of the plurality of placing plates (304) in a penetrating manner.

2. The quick-assembly sealed safety cabinet according to claim 1, wherein a plurality of marking mechanisms (17) is fixedly connected to the lower end of one side of the cabinet body left side plate body (301) and the cabinet body right side plate body (401), and each marking mechanism (17) comprises a marking box (1701), a feeding port (1702), a scented sheet (1703), a discharging hole (1704), a blocking plate (1705), a telescopic column (1706), a fixing rod (1707), a sealing plate (1708) and a spring (1709), the plurality of discharging holes (1704) is formed in the middle of the marking box (1701), the telescopic column (1706) and the spring (1709) are fixedly connected to the middle of the marking box (1701), the sealing plate (1708) is fixedly connected to the lower ends of the telescopic column (1706) and the spring (1709), the sealing plate (1708) is slidably connected to the lower end of the marking box (1701), fixing rods (1707) are fixedly connected to two sides of the upper surface of the sealing plate (1708), and the blocking plate (1705) is fixedly connected to the upper ends of the fixing rods (1707).

3. The quick-assembly sealed safety cabinet according to claim 1, wherein the cabinet top plate (5) comprises a cabinet top plate body (501), a top plate connecting plate (502), a top plate connecting strip (503) and a top plate connecting screw hole (504), the top plate connecting plate (502) is fixedly connected to the periphery of one side of the cabinet top plate body (501), the top plate connecting strip (503) is fixedly connected to the side face of the outer end of the top plate connecting plate (502), and the top plate connecting strip (503) is of a U-shaped structure.

4. The quick-assembly sealed safety cabinet according to claim 3, wherein the cabinet bottom plate (6) comprises a cabinet bottom plate body (601), a bottom plate body connecting plate (602) and a bottom plate body connecting strip (603), the bottom plate body connecting plate (602) is fixedly connected to a periphery of one side of the cabinet body bottom plate body (601), the bottom plate body connecting strip (603) is fixedly connected to an outer side of one end of the bottom plate body connecting plate (602), the bottom plate body connecting strip (603) is of a U-shaped structure, and a plurality of top plate connecting screw holes (504) is formed in the bottom plate body connecting plate (602), the bottom plate body connecting strip (603), the top plate connecting plate (502) and the top plate connecting strip (503) in an array, the cabinet body rear plate (2) comprises a cabinet rear plate body (201), a rear plate body connecting plate (202) and a plurality of rear plate body connecting holes (203), the rear plate body connecting plate (202) is fixedly connected to a periphery of one side of the cabinet body rear plate body (201), the plurality of rear plate body connecting holes (203) is formed in an outer side of the rear plate body connecting plate (202) in a penetrating array, a limiting plate (204) is fixedly connected to a lower end of one side of the cabinet body rear plate body (201), and a plurality of limiting slots (205) is formed in an array on one side of the limiting plate (204) in a penetrating manner.

5. The quick-assembly sealed safety cabinet according to claim 1, wherein a recording mechanism (18) is fixedly connected to an inner side of the cabinet door plate (9), the recording mechanism (18) comprises a recording box (1801), a storage battery (1802), an acceleration sensor (1803), a data memory (1804), a hidden camera (1805) and a sound collector (1806), one side of the recording box (1801) is fixedly connected to the middle of the inner side of the cabinet door plate (9), the acceleration sensor (1803) is fixedly connected to the middle in the recording box (1801), the data memory (1804) and the hidden camera (1805) are fixedly connected to the top in the recording box (1801), and the sound collector (1806) is fixedly connected to the top of the recording box (1801).

6. The quick-assembly sealed safety cabinet according to claim 1, wherein the cabinet body left side plate body (301), the cabinet body right side plate body (401) and the cabinet body top plate body (501) are slidably connected to two sides of the cabinet body bottom plate body (601) by means of bolt and nut assemblies, and the cabinet body left side plate body (301), the cabinet body right side plate body (401) and the cabinet body bottom plate body (601) are fixed through threaded connection with the corresponding side plate connecting screw holes (404) and the top plate connecting screw holes (504) through bolt and nut assemblies.

7. An installation method of the quick-assembly sealed safety cabinet, characterized by comprising the following steps:

S1: a cabinet body front plate (1), a cabinet body rear plate (2), a cabinet body left side plate (3), a cabin body right side plate (4), a cabin body top plate (5) and a cabin body bottom plate (6) being provided, wherein a plurality of fixing bolts (12) is fixedly connected to the periphery of one side of the cabinet body front plate (1), the cabinet body left plate (3) comprises a cabinet body left side plate body (301), a left side plate connecting plate (302), a left side plate connecting strip (303), a plurality of side plate connecting screw holes (404), a plurality of placing plates (304) and a plurality of placing screw hole (305), the left side plate connecting plate (302) is fixedly connected to the periphery of one side of the cabinet body left side plate body (301), and the left side plate connecting strip (303) is fixedly connected to one side of the left side plate connecting plate (302), the cabin body right side plate (4) comprises a cabinet body right side plate body (401), a right side plate connecting plate (402), a right side plate connecting strip (403), a plurality of placing plates (304), a plurality of placing screw holes (305), and a plurality of side plate connecting screw holes (404), the right side plate connecting plate (402) is fixedly connected to the periphery of one side of the cabinet body right side plate body (401), the right side plate connecting strip (403) is fixedly connected to one side of the right side plate connecting plate (402), the plurality of side plate connecting screw holes (404) is formed in the surface of the right side plate connecting plate (402), the right side plate connecting strip (403), the left side plate connecting plate (302) and the left side plate connecting strip (303) in an array penetrating manner, the plurality of placing plates (304) is connected to the adjacent side array buckles of the cabinet body right side plate body (401) and the cabinet body left side plate body (301), and the plurality of placing screw holes (305) is formed in the surface of the plurality of placing plates (304) in a penetrating manner, the cabin body top plate (5) comprises a cabin body top plate body (501), the cabin body bottom plate (6) comprises a cabinet body bottom plate body (601), side plate connecting screw holes (404) and top plate connecting screw holes (504) correspondingly formed in the cabinet body left side plate body (301), the cabinet body right side plate body (401), the cabinet body top plate body (501) and the cabinet body bottom plate body (601), the cabinet body front plate (1) is placed flat, and then the cabinet body left side plate body (301), the cabinet body right side plate body (401), the cabinet body top plate body (501) and the cabinet body bottom plate body (601) are sequentially limited and placed on one side of the cabinet body bottom plate body (601) and the cabinet body bottom plate body (601), and at this time, the corresponding fixing bolts (12) are in threaded connection with the cabinet body left side plate body (301), the cabinet body right side plate body (401), the cabinet body top plate body (501) and the cabinet body bottom plate body (601), and then the cabinet body left side plate body (301), the cabinet body right side plate body (401), the cabinet top plate body (501) and the cabinet body bottom plate body (601) are fixed;

S2: the side plate connecting screw holes (404) and the top plate connecting screw holes (504) adjacent to one side of the cabinet body left side plate body (301) and the cabinet body top plate body (501) are aligned, then fixed by bolts and nuts, then the side plate connecting screw holes (404) and the top plate connecting screw holes (504) adjacent to one side of the cabinet body right side plate body (401) and the cabinet body top plate body (501) are aligned, and then fixed by bolts and nuts; then the side plate connecting screw holes (404) and the top plate connecting screw holes (504) adjacent to one side of the cabinet body left side plate body (301) and the cabinet body bottom plate body (601) are aligned, then fixed by bolts and nuts, then the side plate connecting screw holes (404) and the top plate connecting screw holes (504) adjacent to one side of the cabinet body right side plate body (401) and the cabinet body bottom plate body (601) are aligned, and then the cabinet body right side plate body (401) and the cabinet body bottom plate body (601) are fixed by bolts and nuts;

S3: the cabinet body rear plate body (201) is limited and placed on the other side adjacent to the cabinet body left side plate body (301), the cabinet body right side plate body (401), the cabinet top plate body (501) and the cabinet bottom plate body (601), the rear plate body connecting hole (203) is aligned with the corresponding side plate connecting screw hole (404) and the top plate connecting screw hole (504), and the whole cabinet body assembly is completed by fixing bolts and nuts.

* * * * *